H. Low.
Shearing Metal.
Nº 50,481. Patented Oct. 17, 1865.
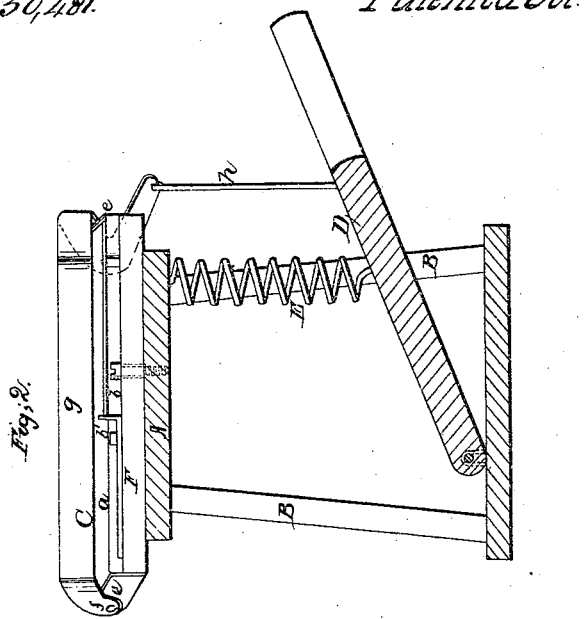
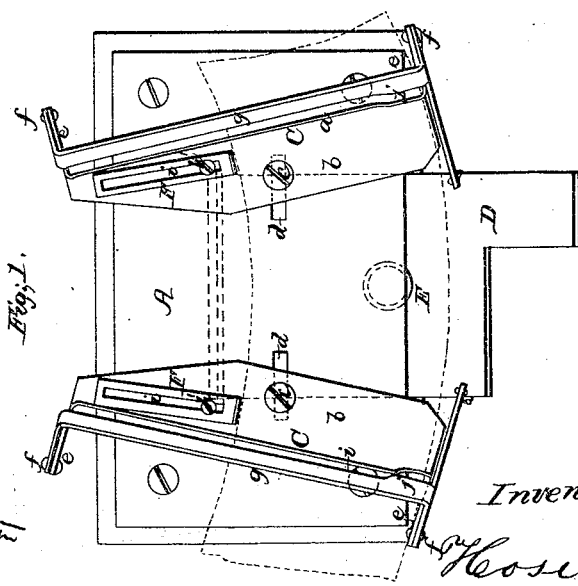
Witnesses:
Inventor;
Hosea Low

UNITED STATES PATENT OFFICE.

HOSEA LOW, OF WAUKON, IOWA.

IMPROVED MACHINE FOR CUTTING SHEET METAL.

Specification forming part of Letters Patent No. 50,481, dated October 17, 1865.

*To all whom it may concern:*

Be it known that I, HOSEA LOW, of Waukon, in the county of Allamakee and State of Iowa, have invented a new and Improved Machine for Cutting Sheet Metal; and I do hereby declare that the following is a full, clear, and exact description thereof, which will enable others skilled in the art to make and use the same, reference being had to the accompanying drawings, forming part of this specification, in which—

Figure 1 represents a plan or top view of this invention. Fig. 2 is a longitudinal vertical section of the same.

Similar letters of reference indicate like parts.

This invention consists in the use of two pairs of shears adjustable for any desired bevel and length, and applied, in combination with a treadle or other suitable mechanism, in such a manner that the bevel ends from curved pieces of sheet metal can be cut with little loss of time and with perfect accuracy.

It consists, further, in the application of adjustable gages, in combination with adjustable shears, in such a manner that the apparatus can be readily set for pieces of sheet metal of any desired width.

It consists, finally, in providing the shears with crooks in the cutting-edges, fitting one another in such a position that by their action the pieces of sheet metal are notched at the same time the bevel ends are cut off, and each piece on being taken from the shears is ready for edging without requiring any further preparation.

A represents a table, made of wood or any other suitable material and supported by legs B. The top of said table supports the shears C, each of which is composed of a movable and of a stationary jaw. The stationary jaws $a$ rise up from the bed-plate $b$, which are secured to the top of the table by means of screws $c$ passing through longitudinal slots $d$, so that the shears can be adjusted to any desired bevel or at any required distance apart. From the ends of the stationary jaws $a$ extend arms $e$, which form the bearings for the pivots $f$ of the movable jaws $g$, and said movable jaws connect by shackle-bars $h$ with a treadle, D, that is situated under the table and serves to depress the jaws. A spring, E, which is applied to the treadle, has a tendency to raise the same and to open the movable jaws to admit the articles to be cut. By stepping on the treadle both shears are made to cut simultaneously.

Gages F, which are secured to the bed-plates $b$ of the shears, serve to adjust the sheet metal in the requisite position. Said gages are adjustable by set-screws $h'$ passing through slots $i$, and they can be reversed, if desired, so that the shears can be used throughout their full length.

The cutting-edges of the shears are provided with crooks $j$, those in the movable jaws being made to match those in the stationary jaws, as shown in Fig. 1 of the drawings. By means of these crooks the edges of the pieces of sheet metal are notched, so that they can be edged without requiring any further labor.

These shears are intended principally for the purpose of cutting off the bevel ends of curved pieces of sheet metal, such as are prepared for the purpose of manufacturing coffee-pots or other conical vessels. If the edges are not cut off properly the form of the vessel is impaired. It is therefore of great importance to cut said edges with perfect accuracy. By my machine this object is obtained, and if the shears are once properly adjusted any desired number of pieces can be cut with perfect accuracy, and the shears and gages can be readily set for pieces of different bevel or of different size.

I claim as new and desire to secure by Letters Patent—

1. The use of two pairs of shears, adjustable for any desired bevel and length, in combination with a treadle or other equivalent device, constructed and operating substantially as and for the purpose set forth.

2. The use of the adjustable and reversible gages F, in combination with the shears C, all constructed and operating substantially as and for the purpose described.

3. The application of crooks $j$ to the cutting-edges of the shears, substantially as and for the purpose specified.

HOSEA LOW.

Witnesses:
M. M. LIVINGSTON,
C. L. TOPLIFF.